March 1, 1960 W. O. BOSS ET AL 2,927,296

CIRCUIT CONNECTOR FOR PRINTED CARDS

Filed April 25, 1956 2 Sheets-Sheet 1

INVENTORS
WILLIAM O. BOSS
RALPH SAUNDERS

BY H. Walter [signature]
AGENT

March 1, 1960 W. O. BOSS ET AL 2,927,296

CIRCUIT CONNECTOR FOR PRINTED CARDS

Filed April 25, 1956 2 Sheets-Sheet 2

INVENTORS
WILLIAM O. BOSS
RALPH SAUNDERS
BY
AGENT

United States Patent Office 2,927,296

Patented Mar. 1, 1960

2,927,296

CIRCUIT CONNECTOR FOR PRINTED CARDS

William O. Boss, West Collingswood, N.J., and Ralph Saunders, Upper Darby, Pa., assignors to Burroughs Corporation, Detroit, Mich., a corporation of Michigan Application April 25, 1956, Serial No. 580,567

6 Claims. (Cl. 339—176)

The invention hereinafter described and claimed has to do with circuit connectors and while of broader applicability, it is particularly well adapted for use in connecting printed circuit panels or cards into the complex circuitry of electronic devices such as computers.

The recent surge in the development of computers has generated a real need for improved components making possible more efficient and less expensive fabrication of such devices. In the past during the initial period of development and under the urgency of time, little attention was given to such matters. Consequently these machines grew to abnormal sizes and with such random assemblies as to make them difficult to test and "de-bug," the latter term being used for the procedure to eliminate errors in the apparatus. Now that computers have become an important factor in our economy, more attention is being given to improving their components to the end that they may more easily be built and "de-bugged" thus to reduce their size and cost, and to increase their reliability.

One of the problems in the assembly of electronic computers resides in the complex "wiring planes," that portion of the computer usually positioned in a vertical plane and upon which is mounted a plurality of socket type connectors for releasably connecting printing circuit panels to the circuits of the computer. Usually these connectors are formed with an insulating body provided with a slot-like socket facing to one side of the structure forming the wiring plane, thus enabling the printed circuit panels to easily be inserted or withdrawn from that side. The connectors also include a plurality of metallic contact elements, one end of each being disposed within the socket for contact with the printed circuits on the panel when the latter is inserted, while the other ends project to the opposite side of the connector, thus providing means for connecting wire leads thereto.

Because of the complexity of the circuitry, the wire leads when placed together in parallel runs, comprise a bundle of substantial diameter in comparison to the diameter of any single wire thereof. Consequently when positioned between adjacent connectors of the type now in common use, connecting individual wires to the projecting contact elements is quite difficult. Additionally, most contacts are numbered for identification, and the bulky bundle of wires makes it so difficult to read the numbers that frequently a connection is made to the wrong contact. Then too, during "de-bugging" of the equipment it is difficult to attach the test scope or meter probe.

Another and important difficulty encountered in the manufacture of such connectors is in the metallic contact element itself which must have a degree of rigidity as well as one of flexibility. This is to enable the elements to be mounted in the connector body by bending small rigid portions thereof on opposite sides of a wall of the connector body, and to permit one end of each contact to extend into the socket recess with sufficient flexibility to grip the printed circuit panel in a manner releasably retaining it in the socket yet simultaneously making positive contact with the circuits on the panels when inserted. The opposite ends of the contacts must extend away from the body a distance sufficient to permit wires to be connected therto as by soldering or other suitable means, and with sufficient rigidity to support the wire and a test probe without falling against adjacent contacts. Because of these particular physical requirements the metal used in the manufacture of the contacts is somewhat brittle. This characteristic frequently results in bent or broken elements during assembly or testing, making it necessary to replace the whole connector, a procedure often requiring disconnecting and reconnecting many leads, some connectors having as many as forty-four of such contact elements.

With the foregoing in mind it is, broadly, the objective of the present invention to provide a novel connector structure overcoming the above-described difficulties.

The invention, also, has as an important object the provision of an improved connector structure permitting quick, easy, and accurate connection and disconnection of circuit wiring and test equipment thereto.

Another object is to provide a novel socket-type connector for printed circuit panels facilitating assembly and service operations in connection therewith.

Still another object of the invention is to provide a novel connector of the above type wherein inadvertent breaking of contact elements is substantially eliminated.

To the foregoing general ends, and briefly described, one exemplary embodiment of the invention includes an elongated housing of dielectric material having a slotted base and a body portion. A plurality of elongated metallic contact elements extend through the housing with one end terminating in the slotted base, whereby they may releasably be connected to the wiring on a printed circuit panel inserted therein. The intermediate portion of each contact extends through the housing while the opposite ends project therefrom thus to provide for connection thereto of associated wiring. Side walls of the housing may be provided with recesses or apertures for access to the intermediate portions of said elements for service operations.

In a preferred form of the invention an insulating cap member is provided over the contact elements to rigidly support their projecting ends to prevent breakage thereof, yet leaving a tip of the ends exposed for attachment of test probes or wires.

The invention may be clearly understood from the following detailed description with reference to the accompanying drawings wherein.

Since the invention is particularly useful in the assembly of wiring planes for electronic computers the following description is in connection with such use.

Figure 1:
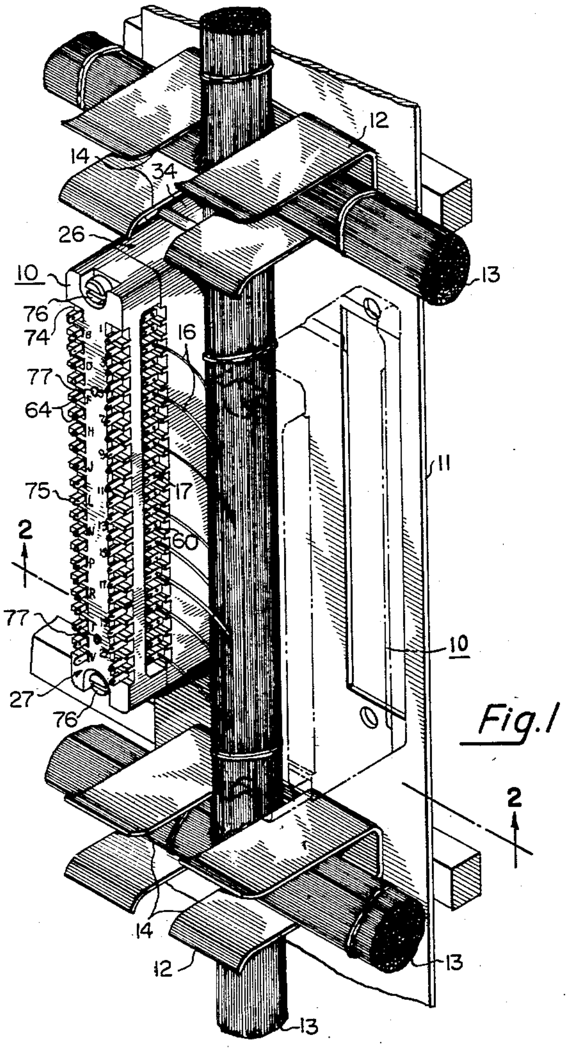
Figure 1 is a perspective view of a fragmentary portion of a computer wiring plane illustrating the invention as it would appear in use.
Figure 2:
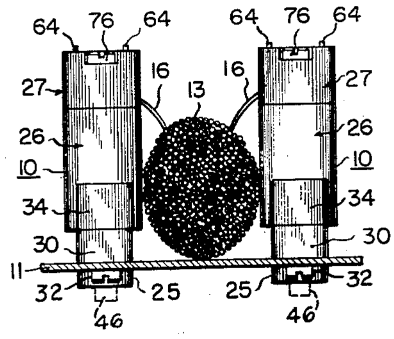
Figure 2 is a sectional view taken along the line 2—2 of Figure 1.

First with reference to Figure 1 it is seen that a circuit connector 10 formed in accordance with the concepts of the invention is mounted on a vertically positioned panel 11 provided with wiring guides in the form of clips 12 for supporting bundles of wires 13 closely adjacent to panel 11. In the presently illustrated apparatus clips 12 are provided with opposed slots 14 aligned with the space between adjacently positioned connectors 10, a second connector being shown in phantom in this figure by broken lines 10. When assembling the panel, wire ends indicated by the numeral 16 are easily peeled from the bundle 13 running between the connectors and secured to contact elements 17 as more fully described hereinafter. With reference to Figure 2 it will be seen that connectors 10 extend well above the bundle of wires 13 running between adjacent connectors and that wire ends 16 may quickly and accurately be secured to the contacts.

Figure 3:
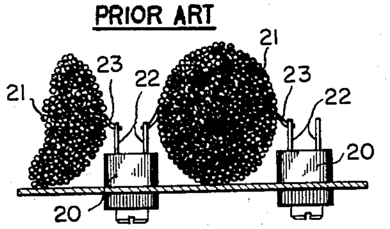
Fig.3 PRIOR ART
Figure 3 is a view similar to Figure 2 but showing the prior art.
Figure 8:
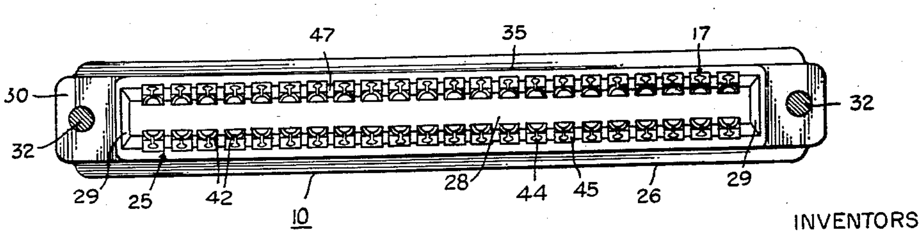
Fig. 8 is a bottom plan view of the connector.

In opposition to the above and with reference to Figure 3 showing a prior art device of the kind commonly used in this type of apparatus, it will be seen that the connectors, identified by the numerals 20, normally are of somewhat less height than the bundles of wire 21, making contact elements 22 somewhat inaccessible for connection thereto of the wire leads 23. It is also difficult to read the identifying nomenclature usually found adjacent each contact element 22, resulting many times in leads being attached to the wrong contact. It is also evident that it would be difficult to de-bug apparatus using this prior art type of connector because of the difficulty in identifying the particular contact to which the test probe should be attached and the difficulty of inserting a test device between the bundles of wire.

Figure 4:
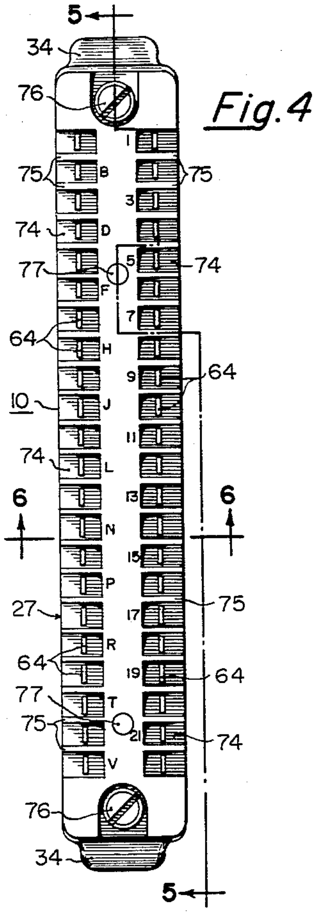
Figure 4 is a top plan view of a connector embodying the principles of the invention.
Figure 5:
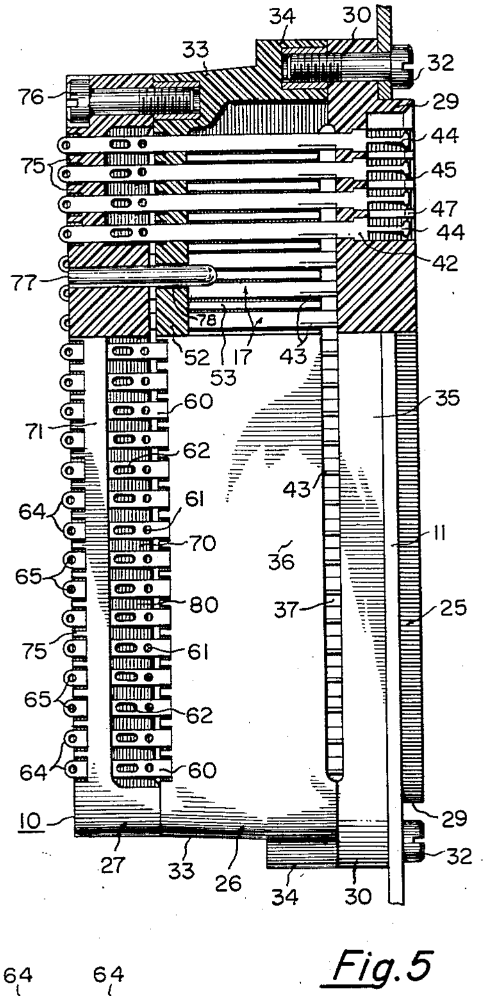
Figure 5 is a side elevational view partially in section as indicated by the line 5—5 of Figure 4.
Figure 6:
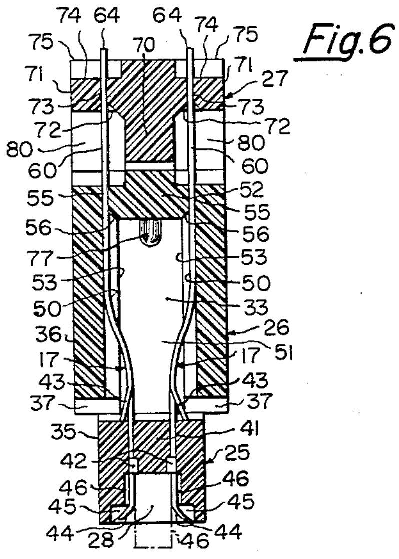
Figure 6 is a sectional view taken along the line 6—6 of Figure 4.

In particular accordance with the present invention, and with reference to Figures 4 through 6, a circuit connector formed in accordance therewith preferably comprises a base portion 25, a body member 26, and a cap 27 all of which are approximately co-extensive in length and breadth, and all formed of an insulating material. Base portion 25 is provided with a slot 28 in one wall thereof—the bottom, as seen in Figure 5—the slot being substantially co-extensive with the length of the base but terminating at opposite end walls 29. Base 25 is also provided with opposite end extensions 30 which provide means for securing the connector to wiring panel 11, and body member 26 to the base, as for example by screw fasteners 32.

Body member 26 is similar in overall shape to base 25 except, as seen more clearly in Figure 6, that it is slightly wider and preferably about twice its height. Similarly to base 25 it is provided with end walls, identified by the numeral 33, and end extensions or flanges 34 (Figure 5) into which fasteners 32 are threaded to secure the body to the base. With reference to Figure 5 it will be seen that adjoining walls 35 and 36 of the base and body portion 25 and 26 respectively have been relieved or cut back between the ends thereof thus to provide an elongated slot or opening 37, the purpose of which will be explained hereinafter.

Returning to Figure 6 it will be seen that the elongated metallic contact elements 17 are provided in two rows of aligned pairs, it being understood, of course, that in some applications only a single row may be used. Each contact extends through and is secured in top wall 41 of base 25 as by inwardly turned integral tab portions 42 on the inner side, and an outwardly turned integral tab 43 on the outer side of the top wall. Each of these elements terminates at the bottom edge of the base with their ends 44 turned outwardly into small pockets 45 in the walls forming slot 28. Room for flexing of the contact elements when a printed circuit panel 46 is inserted is provided by the clearance between the contact and the side walls of the base member as indicated at 46 in Figure 6. In Figure 5 it will be seen that a short wall 47 is provided on the inner face of the walls forming slot 28 and between adjacent contact ends 44 as a safety factor to prevent the ends being bent into contact with an adjacent end.

Figure 7:
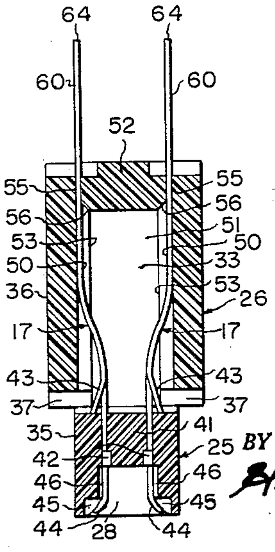
Figure 7 is a view similar to Figure 6 but showing a modified form of the invention.

Returning again to Figure 6, intermediate portion 50 of each contact is shown extending through recess or slot 51 in body member 26, through top wall 52 thereof, and a substantial distance above the top wall, as seen in Figure 7. The inner faces of opposite side walls of the body are provided with upstanding short walls 53 between adjacent contacts to maintain parallel relationship of the latter and to guide the contacts into slots 55 in top wall 52 thereof when assembling the body to base 25, the inner side of top wall 52 also being provided with tapered portions 56 for this purpose.

At this point in the description it should be understood that it is preferred to connect wire leads 16 to the contacts without cap 27 being in position, as seen in Figure 7. To this end the projecting ends 60 of contacts 17 are provided with apertures 61 and 62, see Figure 5, whereby, if desired, a plurality of leads 16 can be connected to each of the contacts. Correct connection of the leads 16 to the proper contact is facilitated by identifying marks on the top wall of body 26, which marks may be letters or numerals or both as seen in Figure 4 on the top wall of cap 27, only every other symbol being used for simplicity. Still with reference to Figure 5 it is seen that the extreme terminal end 64 of each of the contacts is provided with an aperture 65 providing means for connecting a test probe thereto.

It should be understood that in one aspect of the invention the circuit connector may be considered complete without cap member 27. In this condition the connector could be considered adequate for all purposes except that the outer ends of the contacts would be exposed to inadvertent damage, such as bending or breaking. In this regard, and as mentioned above, the type of metal from which the contacts are manufactured is somewhat brittle, and leaving the ends exposed to the extent shown in Figure 7 permits considerable leverage for excessive flexure of the elements leading to eventual damage thereof by fracture or breaking. Therefore, it is preferred that cap 27 be slipped over the contact ends, as shown in Figures 4 through 6.

The cap member comprises a central portion 70 provided with oppositely extending flanges 71. Central portion 70 is of somewhat less thickness than the distance between opposing pairs of connector elements thus providing clearance for wire turns and solder between it and the contacts. The undersides of flanges 71 are provided with tapered grooves 72 to guide the ends of the connector elements through slots 73 in flanges 71. Top walls 74 of the flanges are provided with short walls 75 between each of the terminal ends of contact 17 thus to provide an individual pocket for each end whereby test apparatus attached thereto is kept from drifting into contact with an adjacent contact end. As seen in Figures 4 and 5 the cap may be secured to body member 26 as by screw fasteners 76.

To maintain alignment with the body portion, the cap is provided with a pair of pins 77 secured thereto in any convenient manner and adapted to extend through aperture 78 in top wall 52 of the body portion (see Figure 5). These pins are placed at different distances from opposite ends of the cap to assure that the latter is assembled to the body member with the contact identifying characters (see Figure 4) always beginning at the same end.

Referring now to Figures 5 and 6 it is noted that the cap and body members cooperate to form pockets 80 in opposite walls of the connector structure and around that portion of elements 17 provided with apertures 61 and 62 for connection of leads 15 thereto. Flanges 71 support the ends of elements 17 and hold them in a comparatively rigid condition against inadvertent damage or shorting against adjacent elements by bending or flexure, yet leaving them exposed for service and testing operations therewith.

Occasionally it is necessary to remove one or more of the connector elements from the assembly. This may be accomplished by inserting a tool through the aperture or slot 37 in the side wall of the assembled unit, severing the desired element and then withdrawing the severed ends in opposite directions.

Having now described the invention, it is clear that it provides a novel connector structure eliminating the difficulties of the prior art devices of this type, and one which facilitates assembly and service of electronic devices, and particularly of computer wiring planes. Additionally it provides a novel socket connector for printed circuit panels permitting quick, easy, and accurate connection and disconnection thereto of circuit wiring and test equipment.

What is claimed is:

1. A connector comprising an insulating base member having an elongated slot in one wall thereof, a plurality of aligned elongated metallic contact elements secured at one end to said base with said ends exposed in said slot, a hollow insulating body member secured to said base member and enclosing intermediate portions of said contact elements with the opposite ends thereof projecting from said body member in spaced apart relationship, said connector being provided with openings in side walls thereof at the area of securement of said body member with said base member for access to said intermediate portions, and a cap member secured to said body member and through which said opposite ends extend leaving a tip exposed for attachment thereto of electrical apparatus, the walls of said connector being recessed at the area of securement of said cap member with said body member thus to expose other portions of said contact elements for attachment thereto of circuit wires.

2. A socket connector for printed circuit panels comprising an elongated dielectric base portion having an open elongated recess in one wall thereof for receiving one end of a printed circuit panel, a plurality of elongated metallic contact elements each having one end secured through a wall thereof to said base portion and terminating within said recess for connection with circuits on said panel when the latter is inserted in said recess, an elongated dielectric body member secured to said base portion, said body member having an elongated open recess in the wall thereof facing said base portion, an intermediate portion of said contact elements extending through said last mentioned recess and an opposite wall of said body member whereby their other ends are exposed for connection to associated circuitry, and an elongated cap member secured to said body member in a manner rigidly securing the exposed ends of said contacts but leaving a portion of said contact elements exposed between said body member and said cap member for securement thereto of circuit wires.

3. A socket connector for printed circuit panels comprising an elongated base portion of insulating material and having an open elongated recess in a wall thereof for receiving a printed circuit panel, a plurality of aligned pairs of elongated metallic contact elements each having one end secured to said base portion and terminating within said recess for connection with circuits on said panel when the latter is inserted in said recess, an elongated dielectric body member secured at opposite ends thereof to said base portion, said member having an elongated open recess in the bottom wall thereof facing said base portion, intermediate portions of said contact elements extending through said last mentioned recess and a wall of said body member whereby their other ends are rigidly held but exposed for connection to associated circuitry, and an elongated dielectric cap member secured to said body member for rigidly holding the exposed ends of said contact elements, said cap member being recessed along opposite side walls thereof to expose portions of said contact elements for connection thereto of circuit wiring.

4. A connector comprising an insulating base portion having an elongated slot in one wall thereof, a plurality of aligned elongated metallic contact elements, means securing one end of said contact elements to said base portion with terminal ends thereof exposed within said slot, said securing means comprising bent portions of said contact elements within said slot and bent portions of said contact elements on the outside wall of said base portion opposite to said wall in which said slot is formed, and a body member secured to said outside wall and enclosing an intermediate portion of said contact elements with the opposite ends thereof projecting through and rigidly held by a wall of said body member in spaced apart relationship, said body portion having recesses along wall edges adjoining said base portion, thus to provide access to said bent portions of said contact elements on the outside wall of said base portion whereby said bent portions are exposed for service operations.

5. A connector for printed circuit panels comprising: a socket structure including elongated insulating base, body and cap portions, respectively secured together in stacked relationship; and a plurality of aligned, elongated metallic contact elements extending through the said portions; said base portion having opposed first and second walls, said first wall including an elongated recess to receive said printed panel, said second wall being that wall to which said body portion is secured; said contact elements each having first and second terminal ends and an intermediate portion; said first terminal end of each contact element terminating within said recess for contact with wiring on said panel, and being secured to said base portion by portions thereof bent against said second wall and against a wall within said recess; said intermediate portion of each of said contact elements being housed in and rigidly held by said body portion; said body portion being recessed along edges adjoining said base portion thus to provide access to the said contact elements at the bent portions thereof on said second wall; said second terminal end of each of said contact elements extending into and rigidly held by said cap portion; said cap portion being relieved along edges adjoining said body portion thus to provide access to said contact elements for securing associated electrical conductors to said contacts at a portion thereof rigidly held by said body and cap portions.

6. A connector for printed circuit panels comprising: a socket structure including elongated insulating base, body and cap portions, respectively secured together in stacked relationship; and a plurality of aligned pairs of elongated metallic contact elements extending through the said portions; said base portion having opposed first and second walls, said first wall including an elongated recess to receive said printed panel, said second wall being that wall to which said body portion is secured; said contact elements each having first and second terminal ends and an intermediate portion; said first terminal end of each contact element terminating within said recess for contact with wiring on said panel, and being secured to said base portion by portions thereof bent against said second wall and against a wall within said recess; said intermediate portion of each of said contact elements being housed in and rigidly held by said body portion; said base and body portions being relieved along adjoining edges thus forming recesses on opposite side walls of the connector providing access to the said contact elements at the bent portions on said second wall; said second terminal end of each of said contact elements extending into and rigidly held by said cap portion; said body and cap portions being relieved along adjoining edges thus to provide access to said contact elements for securing associated electrical conductors to said contact elements at a portion thereof rigidly held by said body and cap portions.

(References on following page)

References Cited in the file of this patent

UNITED STATES PATENTS

| | | |
|---|---|---|
| 1,686,534 | Rosenzweig | Oct. 9, 1928 |
| 2,391,324 | Martin | Dec. 18, 1945 |
| 2,411,014 | Warnke | Nov. 12, 1946 |
| 2,688,123 | Benham et al. | Aug. 31, 1954 |
| 2,691,147 | Sutton et al. | Oct. 4, 1954 |
| 2,699,534 | Klostermann | Jan. 11, 1955 |
| 2,853,689 | Jackson et al. | Sept. 23, 1958 |

OTHER REFERENCES

A.I.E.E., Am. Standard Definitions of Electrical Terms (1942), page 101.

Buchanan: "Electronic Design," March, 1955, page 80.

Buggie Catalog (1954), p. 2.